(12) United States Patent
Kawakami

(10) Patent No.: US 8,102,485 B2
(45) Date of Patent: Jan. 24, 2012

(54) ELECTRO-OPTICAL DEVICE INCLUDING PRISMATIC CONDENSING LAYERS

(75) Inventor: Hisanori Kawakami, Matsumoto (JP)

(73) Assignee: Sony Corporation, Tokyo (JP)

( * ) Notice: Subject to any disclaimer, the term of this patent is extended or adjusted under 35 U.S.C. 154(b) by 1155 days.

(21) Appl. No.: 11/337,848

(22) Filed: Jan. 23, 2006

(65) Prior Publication Data

US 2006/0215078 A1    Sep. 28, 2006

(30) Foreign Application Priority Data

Mar. 22, 2005   (JP) ................. 2005-081120

(51) Int. Cl.
*G02F 1/1335* (2006.01)
*F21V 7/04* (2006.01)

(52) U.S. Cl. ............ 349/64; 349/61; 349/62; 349/65; 362/610

(58) Field of Classification Search ............ 349/95, 349/61–65; 362/610
See application file for complete search history.

(56) References Cited

U.S. PATENT DOCUMENTS

| | | | |
|---|---|---|---|
| 2005/0174509 A1* | 8/2005 | Sawayama et al. | 349/65 |
| 2006/0146227 A1* | 7/2006 | Park et al. | 349/64 |

FOREIGN PATENT DOCUMENTS

| | | | |
|---|---|---|---|
| JP | 06-118410 | | 4/1994 |
| JP | 07-191319 | | 7/1995 |
| JP | 08-036179 | * | 2/1996 |
| JP | 10-319216 | | 12/1998 |

\* cited by examiner

*Primary Examiner* — Lauren Nguyen
(74) *Attorney, Agent, or Firm* — K&L Gates LLP

(57) ABSTRACT

An electro-optical device includes: an electro-optical panel that includes a plurality of pixels each of which is equipped with a light transmissive region are arranged along a plane, the light transmissive regions being formed with a first arrangement period in a first direction in the plane, and being formed with a second arrangement period, which is larger than the first arrangement period, in a second direction in the plane that is orthogonal to the first direction; a backlight that illuminates a light beam to the electro-optical panel; a first condensing layer that is disposed between the electro-optical panel and the backlight and has a first optical structural period substantially along the first direction; and a second condensing layer that is disposed between the electro-optical panel and the first condensing layer and has a second optical structural period substantially along the second direction. In the electro-optical device, the ratio of the first arrangement period to the first optical structural period is smaller than the ratio of the second arrangement period to the second optical structural period.

9 Claims, 5 Drawing Sheets

ELECTRO-OPTICAL DEVICE INCLUDING PRISMATIC CONDENSING LAYERS

BACKGROUND

1. Technical Field

The present invention relates to an electro-optical device, to an electronic apparatus, and to an illuminating device. In particular, the invention relates to a structure of an electro-optical device equipped with condensing layers such as prism sheets.

2. Related Art

In general, as shown in FIG. 8, a liquid crystal display device 10 is known which has a liquid crystal display panel 2 that modulates transmitted light, and a backlight 4 disposed at the backside of the liquid crystal display panel 2 (opposite to the viewer's side) that provides a light beam to the liquid crystal display panel 2 so that it realizes a desired display scheme by controlling the transmission state of the illuminating light emitted from the backlight 4 by way of a light shutter function of the liquid crystal display panel.

In the above-mentioned liquid crystal display device 10, the display brightness is often enhanced by disposing two condensing sheets 6 and 7 made of prism sheets, etc., between the liquid crystal display panel 2 and the backlight 4 to raise the percentage of the illuminating light used as the display light, i.e., the utilization efficiency of the light. On the condensing sheets 6 and 7, in order to collect the emitted light from the backlight 4 to the viewer's side, a plurality of condensing structures, more specifically, prism structures 6a and 7a made of hill-shaped or V-groove-shaped surface structures are periodically formed. Usually, the condensing sheets 6 and 7 are disposed so that the arrangement directions of the optical structural periods are orthogonal to each other.

The above-mentioned condensing sheets 6 and 7 are capable of collecting the illuminating light emitted from the backlight 4 toward the viewer's direction, thereby enhancing the brightness of the liquid crystal display device 10 by more than several tens percent. Although condensing sheets having various condensing structures are known, the condensing sheets having the hill-shaped or V-groove-shaped prism structure as the illustrated example are most common. FIG. 9 is a graph showing the relationship, for such condensing sheets (prism sheets), between the optical structural period (hill-shaped or V-groove-shaped formation period) and the rate of increase in the brightness by the condensing sheets. Here, the abscissa shows the optical structural period, and the ordinance shows the rate of increase in the brightness. Furthermore, the rate of increase in the brightness on the ordinance is shown by taking the brightness when only a diffusing sheet is disposed on the light-guiding plate of the backlight as a reference, and showing, with respect to the reference, the rate of increase in the brightness when an additional condensing sheet is disposed on the diffusing sheet. According to the graph, if the optical structural period of the condensing sheet is equal to or above 20 μm, the rate of increase in the brightness becomes 1.5 times or larger.

However, when the condensing sheets are used as described above for the liquid crystal display device 10, based on the relationship between the optical structural periods of the condensing sheets 6 and 7 and the arrangement period of the pixels in the liquid crystal display panel 2, a stripe-shaped contrast unevenness having a strong modulation degree (hereinafter, referred to as the "moiré fringes") may occur, and thus the display quality of the liquid crystal display device may be degraded, which is problematic. To solve the problem, it is conceivable to provide a liquid crystal display device in which the optical structural periods of the condensing sheets 6 and 7 are smaller than the arrangement pitch of the pixels of the liquid crystal display panel 2 (for example, refer to JP-A-06-118410 or JP-A-08-036179).

More specifically, in this liquid crystal display device, when the pitch of the stripe grooves of the prism plate disposed between the liquid crystal display panel and the backlight is denoted as $\lambda 1$, and the pitch of the transparent electrode wiring lines of the liquid crystal display panel is denoted as $\lambda 2$, by making $\lambda 1 \leq 0.075 \lambda 2/(\lambda 2+0.075)$, the gap between the moiré fringes becomes equal to or below 75 μm, and thus the moiré fringes cannot be recognized by naked eyes (refer to JP-A-06-118410).

Further, it is conceivable to provide a liquid crystal display device in which two condensing sheets are disposed between the liquid crystal display element and the backlight, and the optical structural period of the condensing sheet which is closer to the liquid crystal display element is made smaller than the arrangement period of the pixels of the liquid crystal display element, thereby obtaining a uniform display which is free of the moiré fringes (refer to JP-A-08-036179).

However, due to the reduction of the arrangement pitch of pixels together with the enhancement of precision of the liquid crystal display device these days, the arrangement pitch of the pixels approaches the optical structural periods of the commonly used condensing sheets, and thus the moiré fringes become easy to occur, and the moiré fringes becomes even more prominent, and thus the display quality gets degraded, which is problematic.

Under the circumstances, if the optical structural periods of the condensing sheets are made equal to or below the arrangement period of the pixels as in the above-mentioned liquid crystal display devices (refer to refer to JP-A-06-118410 or JP-A-08-036179), since it is necessary to use condensing sheets having fine optical structures, there is a problem that the cost to obtain the condensing sheets rises. Also, there is a problem that reducing the optical structural periods of the condensing sheets would lower the rate of increase in the brightness as shown in FIG. 9. In particular, since the rate of increase of the brightness significantly drops when the optical structural period of a condensing sheet becomes equal to or below 10 μm, using the condensing sheet itself may become meaningless.

SUMMARY

An advantage of some aspects of the invention is that it provides an electro-optical device that is capable of making the moiré fringes hard to occur even through the enhancement of precision, and preventing the degradation of the display quality. Another advantage of some aspects of the invention is that it provides an electro-optical device that is capable of mitigating the moiré fringes in display without degrading the display brightness.

An electro-optical device according to a first aspect of the invention is provided which includes an electro-optical panel with a plurality of pixels, each of which is equipped with a light transmissive region, that are arranged along a plane. The light transmissive regions are formed with a first arrangement period in a first direction in the plane, and are formed with a second arrangement period, which is larger than the first arrangement period, in a second direction in the plane that is orthogonal to the first direction. The electro-optical device further includes a backlight for illuminating a light beam to the electro-optical panel, a first condensing layer, disposed between the electro-optical panel and the backlight, having a first optical structural period substantially along the first direction, and a second condensing layer, disposed between the electro-optical panel and the first condensing layer, having a second optical structural period substantially along the second direction.

As described above, it is difficult to reduce the optical structural periods of the condensing sheets since reducing the first optical structural period and the second optical structural period would lower the light-collecting performance as shown in the graph in FIG. 9 and raise the cost. Accordingly, when the second arrangement period along the second direction of the light transmissive region is constituted to be larger than the first arrangement period along the first direction, the first condensing layer has the first optical structural period substantially along the first direction, and the second condensing layer has the second optical structural period substantially along the second direction, then, as the first and the second arrangement periods are reduced due to the enhancement of precision of the electro-optical panel, they approach the respective first and the second optical structural periods, respectively. In particular, since the smaller first arrangement period is apt to approach the first optical structural period more easily, there is a tendency that the possibility of the occurrence of the moiré fringes and the strength of the moiré fringes when the moiré fringes occur based on the relatively small first arrangement period and the first optical structural period along the first direction are larger than the possibility of the occurrence of the moiré fringes and the strength of the moiré fringes (contrast ratio) when the moiré fringes occur based on the relatively large second arrangement period and the second optical structural period along the second direction.

However, according to the aspect, by disposing the first condensing layer on a location separate apart from the electro-optical panel than the second condensing layer, the contrast state caused by the first optical structural period of the first condensing layer is mitigated until it reaches the electro-optical panel. Therefore, the frequency of occurrence and the strength of the moiré fringes based on first optical structural period of the first condensing layer and the first arrangement period of the electro-optical panel can be reduced, and thus the display quality of the electro-optical device can be prevented from being degraded as a whole.

In particular, it is preferable that the ratio of the first arrangement period to the first optical structural period be smaller than the ratio of the second arrangement period to the second optical structural period. According to this construction, since the moiré fringes based on the relationship between the first arrangement period and the first optical structural period are more likely to occur than the ones based on the relationship between the second arrangement period and the second optical structural period, the invention can be more effective if applied.

According to the first aspect of the invention, it is preferable that the first optical structural period and the second optical structural period be made by periodically arranging prism-shaped patterns. Since it is easier to improve the light-collecting property and the contrast distribution of the illuminating light in the direction in which the prism-shaped patterns are periodically arranged is easier to occur by periodically arranging prism-shaped patterns, the invention can be more effective if applied.

According to the first aspect of the invention, it is preferable that the first and the second condensing layers have stripe-shaped optical structures extending to the directions orthogonal to the formation directions of the first and the second optical structural periods, respectively. According to this construction, by having a stripe-shaped optical structure, the first condensing layer and the second condensing layer do not have the optical structural periods, which cause the moiré fringes, in the directions orthogonal to the formation directions of the first and the second optical structural periods, respectively, and therefore, the effect of the invention can be further enhanced.

According to the first aspect of the invention, it is preferable that the first optical structural period be equal to or below the first arrangement period. By making the first optical structural period of the first condensing layer equal to or below the first arrangement period; the period of the contrast state of the illuminating light caused by the first optical structural period, becomes equal to or below the first arrangement period, and therefore, the moiré strength visually recognized through the light transmissive region based on the first condensing layer can be further reduced.

According to the first aspect of the invention, it is preferable that the second optical structural period be equal to or below the second arrangement period. If the second optical structural period of the second condensing layer is equal to or below the second arrangement period of the light transmissive region, the period of the contrast state of the illuminating light caused by the second optical structural period, becomes equal to or below the second arrangement period, and therefore, the moiré strength visually recognized through the light transmissive region can be further reduced.

According to the first aspect of the invention, it is preferable that the first optical structural period is smaller than the second optical structural period. Since the first arrangement period of the light transmissive region is smaller than the first arrangement period, by making the first optical structural period smaller than the second optical structural period, it is possible to set the optical structural periods according to the magnitude relation of the arrangement periods in two directions, i.e., the first direction and the second direction of the light transmissive region, and therefore, the frequency of occurrence of the moiré fringes and the moiré strength can be further reduced as a whole.

According to the first aspect of the invention, it is preferable that another optical layer be disposed between the electro-optical panel and the first condensing layer. According to this construction, by disposing another optical layer such as a light diffusing sheet or a reflective polarizer, the first condensing layer can be made farther from the electro-optical panel, and therefore, the frequency of occurrence of the moiré fringes and the moiré strength can be further reduced.

Next, the electronic apparatus according to a second aspect of the invention is provided which has one of the electro-optical devices described above. According to this aspect, the electronic apparatus has one of the electro-optical devices described above, and thus the display quality can be prevented from being degraded due to the moiré fringes unlike the related art, and a device with a higher display quality can be made. In particular, the degradation of display quality due to the enhancement of precision of the electro-optical device can be avoided. Here, the above-mentioned electronic apparatus can be a liquid crystal television, a cellular phone, an electronic notebook, a personal computer, a workstation, a videophone, a POS terminal, a touch panel, and the like.

Furthermore, an illuminating device according to a third aspect of the invention is provided which includes a planar light-emitter for emitting illuminating light from a light-emitting surface, a first condensing layer, disposed on the light-emitting surface of the planar light-emitter, having a first optical structural period along a first direction in a plane substantially parallel to the light-emitting surface, and a second condensing layer, disposed on the opposite side of the planar light-emitter of the first condensing layer, having a second optical structural period, which is larger than the first optical structural period, along a second direction, in the plane, orthogonal to the first direction.

According to the third aspect of the invention, the second optical structural period is larger than the first optical structural period, and thus the first condensing layer having the relatively smaller first optical structural period is separated apart from the object which is illuminated by the illuminating device farther than the second condensing layer. Therefore, the frequency of occurrence of the moiré fringes and the moiré strength caused by the period structure of the object and the optical structural periods of the condensing layers can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
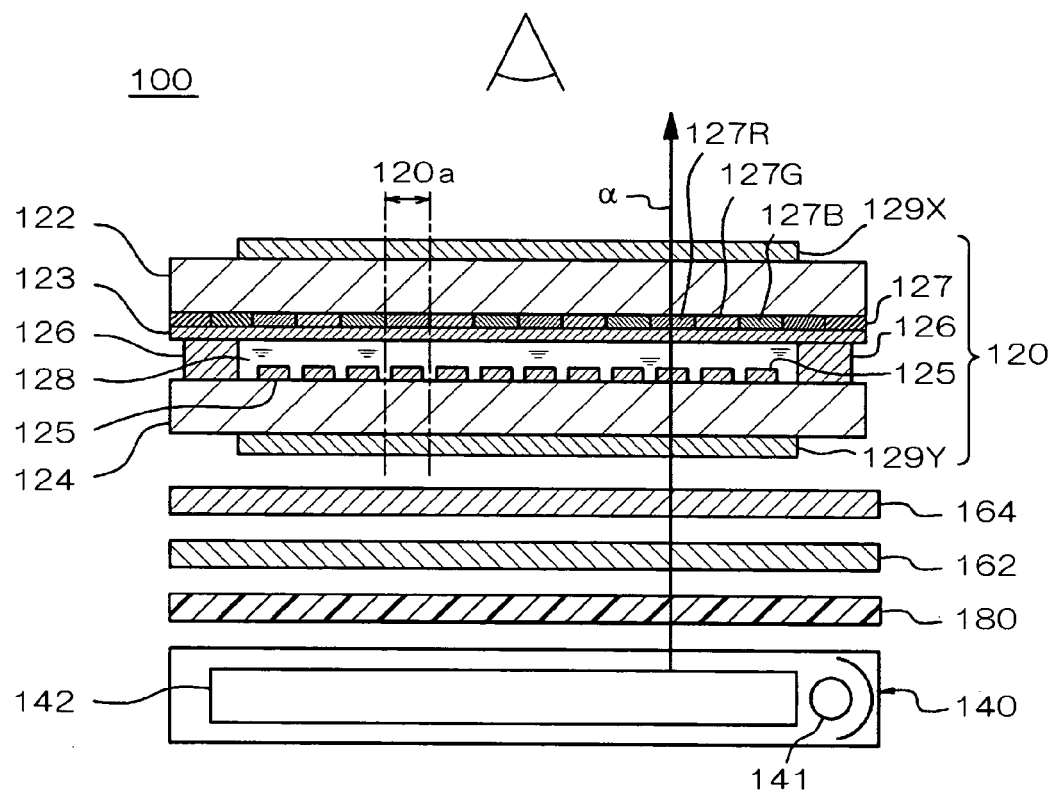
FIG. 1 is a vertical cross sectional view schematically showing a liquid crystal display device according to a first embodiment of the invention.

Hereinafter, the embodiments of the electro-optical device according to the invention will be described with reference to the accompanied drawings. The present embodiments are implementations of the electro-optical device according to the invention as a liquid crystal device. FIG. 1 is a vertical cross sectional view schematically showing the liquid crystal device 100 of the embodiment according to the invention.

As shown in FIG. 1, the liquid crystal display device 100 of the present embodiment includes a backlight 140, a diffusing sheet 180, two condensing sheets 162 and 164, and a liquid crystal display panel 120. The liquid crystal device 100 has structure in which such layers are laminated toward the viewer's side in that order. It is noted that, although gaps are shown to exist between the elements constituting the liquid crystal display device 100 for the purpose of facilitating the understanding of the structure, and as a practical matter, the elements are preferably disposed as they virtually intimately contact each other.

The liquid crystal display panel 120 has a transmissive cell structure. The liquid crystal display panel 120 is formed by bonding a substrate 122 on which a color filter 127 and a transparent electrode 123 are formed, and a substrate 124 on which transparent electrodes 125 are formed, via a sealing material 126, and filling liquid crystal 128 into the space formed by the two substrates 122 and 124 and the sealing material 126. Also, polarizing plates 129X and 129Y are disposed on the outer surface of each of the substrates 122 and 124, respectively, by, for example, bonding.

A plurality of pixels 120a are arranged crosswise on the liquid crystal display panel 120, and each of the plurality of pixels 120a is provided with a light transmissive region, respectively. Since a transmissive panel is used in the present embodiment, the plurality of pixels 120a, each of which is equipped with the light transmissive region, have substantially the same shape as the light transmissive regions provided to the pixels 120a, but, as a practical matter, sometimes a light shielding region exists at the outer periphery of each of the pixels 120a. It is noted that, if the shape and the formation location of the light transmissive region other than the light shielding region is the same across the pixels 120a, since arrangement period of the light transmissive regions basically matches the formation pitch of the pixels 120a, the pixel pitch will be used in the following description instead of the arrangement period of the light transmissive region.

In the present embodiment, the liquid crystal display panel 120 is constituted so that, by applying a voltage between each pair of the transparent electrodes 123 and 125 that are opposing each other to drive the liquid crystal 128, the optical characteristics of the transmitted light α can be changed for each pixel 120a, and thus a display can be achieved. In other words, each of the pixels 120a constitutes a minimum unit area that can independently control the optical characteristics of the liquid crystal display panel 120. Here, each of the pixels 120a has a planar shape that has a vertical width and a horizontal width that are different from each other, as will be described later.

The color filter 127 has a stripe-shaped structure as a whole, in which three colors, i.e., R (Red), G (Green), and B (Blue), of colored layers 127R, 127G, and 127B are periodically arranged. Each of the three colors of colored layers 127R, 127G, and 127B are formed so as to correspond to each of the pixels 120a. In other words, when viewed from left to right in the drawing, the colored layers 127R, 127G, and 127B are arranged corresponding to the pixels 120a repeatedly in sequence.

The backlight 140 for illuminating the liquid crystal display panel 120 from the backside is disposed at the back of the liquid crystal display panel 120. The backlight 140 is formed by disposing a light source 141 such as a cold cathode tube, an LED (Light Emitting diode), or the like, adjacent to the side surface of a light-guiding plate 142, which is not shown, made of transparent synthetic resin such as acrylic resin. In the backlight 140, the light emitted from the light source 141 is introduced into the light-guiding plate 142 from the end surface of it, propagates through the light-guiding plate 142, and is gradually emitted from a surface of the light-guiding plate 142 by the light emitting structure formed of, for example, a fine surface unevenness structure, which is not shown. According to this, a uniform illuminating light as a whole is emitted from the surface of the light-guiding plate 142. A light-reflective sheet, which is not shown, is preferably disposed on the back of the light-guiding plate 142.

The light diffusing sheet 180 is disposed at the light-emitting side of the light-guiding plate 142, and has the function of scattering or diffusing the illuminating light in order to improve the uniformity of luminance of the illuminating light emitted from the surface of the light-guiding plate 142. The light diffusing sheet 180 can be formed by coating resin containing transparent beads on a transparent sheet made of synthetic resin such as, for example, polyester.

The two condensing sheets 162 and 164 are disposed between the liquid crystal display panel 120 and the light diffusion sheet 180, and collect the light α from the backlight 140 toward the front surface of the liquid crystal display panel 120 to enhance the frontal brightness of the two condensing sheets, the first condensing sheet 162 is disposed on the side of the backlight 140, and the second condensing sheet 164 is disposed on the side of the liquid crystal display panel 120.

Figure 2:
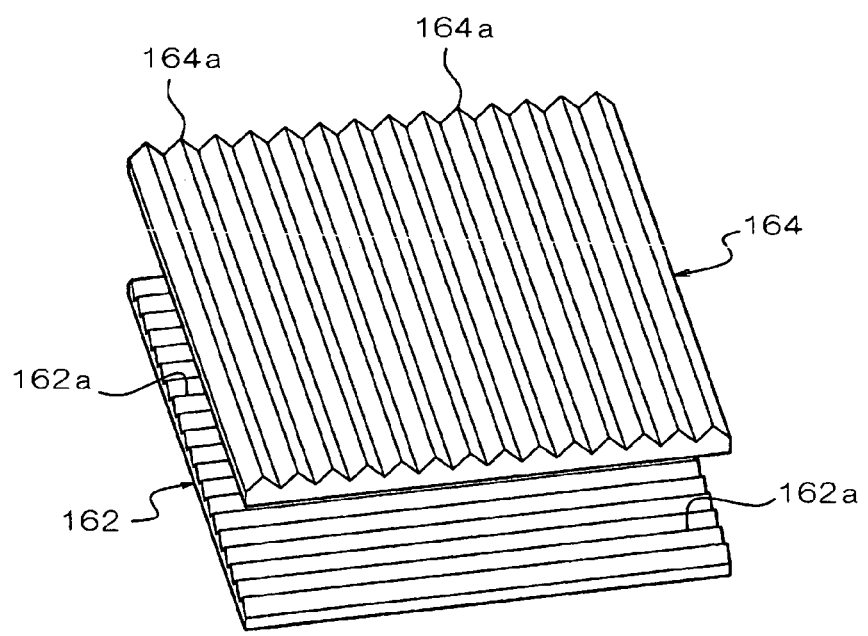
FIG. 2 is a perspective view schematically showing the positional relationship of two condensing sheets.

FIG. 2 is a perspective view schematically showing the first and second condensing sheets 162 and 164 when viewed from an oblique upside. As shown in FIG. 2, a plurality of hill-shaped (reverse V-shaped) protrusions 162a and 164a are periodically formed on the first condensing sheet 162 and the second condensing sheet 164, respectively, and they are formed in stripe-shapes as a whole. Each of the protrusions 162a and 164a optically functions as a prism, respectively, and the arrangement scheme constitutes an optical structural period on the first and the second condensing sheets 162 and 164. In other words, the optical structural period has the form of a surface structure in which V-shaped grooves are periodically formed on the surface.

More specifically, the vertex angle of each of the protrusions 162a and 164a (the angle between the oblique surfaces on both sides of each of the edge lines) and the angle between the adjacent protrusions (the base angle of the V-shaped groove) are constituted to be about 80 to 90 degrees, and the edge lines (ridge lines) of the protrusions 162a and 164a and the valley lines of the V-shaped grooves are alternately disposed.

Here, the first and the second condensing sheets 162 and 164 are disposed so that the extending direction of the protrusions 162a and the extending direction of the protrusions 164a are mutually orthogonal. In other words, the formation direction of the first optical structural period formed by the protrusions 162a in the first condensing sheet 162 (a direction orthogonal to the extending direction of the protrusions 162a) and the formation direction of the second optical structural period formed by the protrusions 164a in the second condensing sheet 164 (a direction orthogonal to the extending direction of the protrusions 164a) are mutually orthogonal.

Thus, the illuminating light from the backlight 140 can be collected in the front/rear direction of the drawing by using the first condensing sheet 162, and the illuminating light can be collected in the right/left direction of the drawing by the second condensing sheet 164. Accordingly, by using the two condensing sheets 162 and 164 as described above, a significant part of the illuminating light having random emitting angles can be transformed to the light that may be used as the display light.

Figure 3:
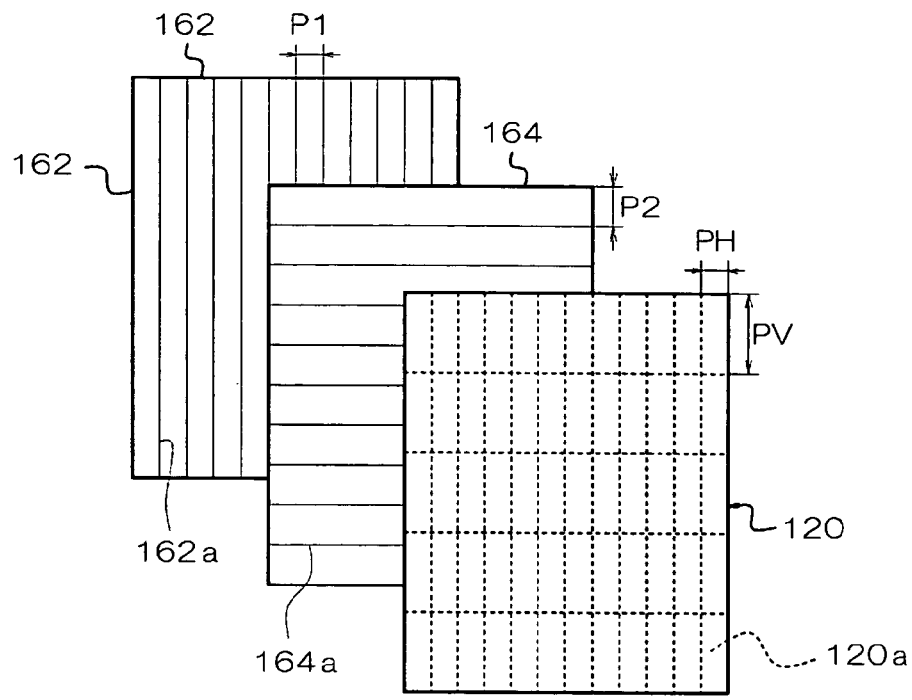
FIG. 3 is an explanatory drawing schematically showing the positional relationship of a liquid crystal display panel and the two condensing sheets.

FIG. 3 is an explanatory drawing that schematically shows an overlapped version of the arrangement scheme of pixels constituted on the liquid crystal display panel 120 of the present embodiment (arrangement scheme of the light transmissive regions), the optical structure of the second condensing sheet 164 disposed at the backside of the liquid crystal display panel 120 (arrangement scheme of the protrusions 164a), and the optical structure of the first condensing sheet 162 disposed at the backside of the second condensing sheet 164 (arrangement scheme of the protrusions 162a).

Each of the pixels 120a provided on the liquid crystal display panel 120 has a rectangular shape that is long in the up and down direction of the drawing (hereinafter, simply referred to as a "vertical direction"), and is short in the right and left of the drawing (hereinafter, simply referred to as a "horizontal direction"). Therefore, the vertical arrangement pitch PV of each of the pixels 120a is constituted to be larger than the horizontal arrangement pitch PH of each of the pixels 120a. In case of the illustrated example, the vertical arrangement pitch PV is about 2.5 to 3 times the horizontal arrangement pitch PH.

Here, although each of the protrusions 162a on the first condensing sheet 162 extends approximately in the vertical direction, since the first optical structural period P1 constituted by each of the protrusions 162a on the first condensing sheet 162 is formed in the direction orthogonal to the extending direction of each of the protrusions 162a, the first optical structural period P1 is formed approximately in the horizontal direction.

Also, although each of the protrusions 164a on the second condensing sheet 164 extend approximately in the horizontal direction, since the second optical structural period P2 constituted by the protrusions 164a on the second condensing sheet 164 is formed in the direction orthogonal to the extending direction of the protrusions 164a, the second optical structural period P2 is formed approximately in the vertical direction.

The first optical structural period P1 constituted on the first condensing sheet 162 periodically changes the luminance distribution of the illuminating light from the backlight 140 in the horizontal direction. In other words, when viewed in the horizontal direction, luminance unevenness in the contrast occurs with a period corresponding to the first optical structural period P1. The luminance unevenness occurs because the light-collecting performance is lowered near the edge lines or the valley lines since the edge lines (ridge lines) of the protrusions 162a or the valley lines between the adjacent protrusions 162a cannot be formed as precise lines because of the limit on the processing precision, or, because the amounts of light collected on the inclined surfaces of both sides of the protrusions 162a are different from each other due to the fact that the light source 141 is disposed only at one side of the light-guiding plate 142, etc.

Furthermore, as described above, the second optical structural period P2 constituted on the second sheet 164 periodically changes the luminance distribution of the illuminating light from the backlight 140 in the vertical direction. In other words, when viewed in the vertical direction, luminance unevenness in the contrast occurs with a period corresponding to the second optical structural period P2. The reason for that is similar to that in the case of the first optical structural period P1 described above.

Here, the formation direction of the first optical structural period P1 of the first condensing sheet 162 and the above-mentioned horizontal direction may be completely identical to each other as in the illustrated example, or they may be inclined to each other within a range of about 1 to 25 degrees (preferably, about 2-20 degrees). Similarly, the formation direction of the second optical structural period P2 of the second condensing sheet 164 and the vertical direction may be completely identical to each other as in the illustrated example, or they may be inclined to each other within a range of about 1 to 25 degrees (preferably, about 2 to 20 degrees). This is because, even in cases when they are more or less inclined to each other, as in cases when they are completely identical to each other, the existence and the strength of moiré fringes extending approximately in the vertical direction are determined by the relationship between the first optical structural period P1 and the horizontal arrangement pitch PH of the pixels 120a, and the existence and the strength of moiré fringes extending approximately in the horizontal direction are determined by the relationship between the second optical structural period P2 and the vertical arrangement pitch PV of the pixels 120a. Accordingly, in the present specification, the formation directions of the first optical structural period P1 and the second optical structural period P2, if they are within the above-mentioned ranges of inclination, are covered by the cases when they are set along the substantially horizontal or vertical directions.

Furthermore, in case of the illustrated example, although the horizontal pixel pitch PH is drawn to be substantially identical to the formation pitch of the protrusions 162a on the first condensing sheet 162, i.e., the first optical structural period P1, as a practical matter, the horizontal pixel pitch is not required to be identical to the formation pitch of the protrusions 162a. In case when the first optical structural period P1 is formed in the horizontal direction as in the illustrate example, if the horizontal pixel pitch PH is completely identical to the first optical structural period P1, even when the above-mentioned luminance unevenness occurs by the first condensing sheet 162, since the difference in the luminance between the pixels 120a in the pixel column arranged in the horizontal direction does not occur, and therefore, as a general rule, the moiré fringes in the vertical direction do not occur. Also, in such cases, the problem that the invention seeks to solve does not exist. As a practical matter, however, it is difficult, in terms of the manufacturing, to match the first optical structural period P1 of the first condensing sheet 162 to the pixel pitch PH with a high precision, and in cases when liquid crystal display panels having various structural dimensions are manufactured, it is impracticable, in terms of cost, to prepare the first condensing sheet 162 that matches the pixel dimension of each of the liquid crystal display panel with a high precision.

As described above, although it is not necessary to match the horizontal pixel pitch PH to the first optical structural period P1 of the first condensing sheet 162 (in other words, the formation period of the protrusions 162a), it is preferable that the first optical structural period P1 is equal to or below the horizontal pixel pitch PH. This is because, when the first optical structural period P1 is larger than the pixel pitch PH, the luminance unevenness between the pixels 120a in the pixel column arranged in the horizontal direction becomes large, and thus the moiré fringes in the vertical direction occur and the strength of the moiré fringes become large accordingly, while, when the first optical structural period P1 is smaller than the pixel pitch PH, although moiré fringes might occur in the vertical direction, the strength of the moiré fringes becomes weak, and the period of the moiré fringes becomes smaller accordingly, and thus become less prominent.

On the other hand, the same also applies to the vertical pixel pitch PV and the second optical structural period P2 of the second condensing sheet 164. In particular, the fact that it is preferable that the second optical structural period P2 is equal to or below the pixel pitch PV, and the reason thereof are similar to those in the above description.

Figure 9:
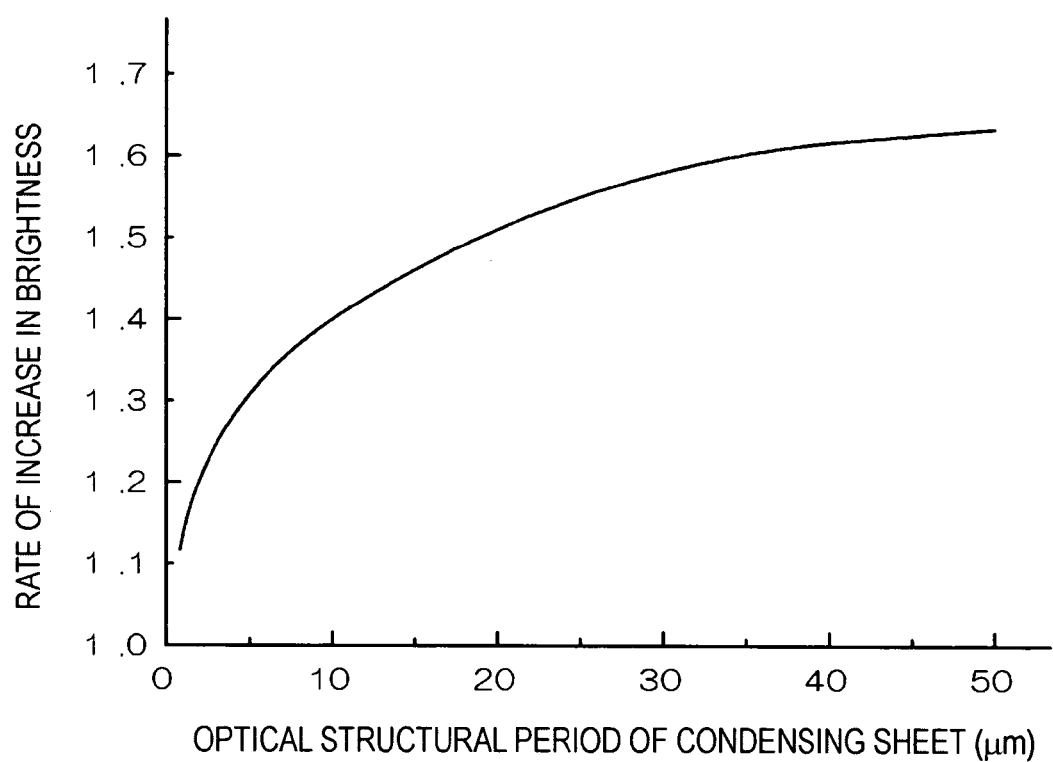
FIG. 9 is a graph showing the relationship between the formation period of the protrusion of the condensing sheet and the rate of the increase in the brightness.

As described above, in order to eliminate the moiré fringes or lower the strength of the moiré fringes, it is preferable that each of the optical structural periods P1 and P2 of the condensing sheets is equal to or below each of the pixel pitches PH and PV, respectively. Also, since it is difficult to match each of the optical structural periods P1 and P2 to each of the pixel pitches PH and PV, respectively, it is preferable to reduce the optical structural periods P1 and P2 to be much smaller than the pixel pitches PH and PV, respectively. However, as a practical matter, reducing the optical structural periods P1 and P2 of the condensing sheets is difficult for various reasons. For example, since optical precision is required for the condensing sheets 162 and 164, reducing the optical structural periods P1 and P2 would make the manufacturing difficult, and also, light-collecting performance is lowered as shown in FIG. 9 from the fact that optical precision cannot be secured.

In particular, in the present embodiment, the horizontal pixel pitch PH is smaller than the vertical pixel pitch PV. Therefore, if the first optical structural period P1 is approximately the same as the second optical structural period P2, since the ratio of the pixel pitch PH to the first optical structural period P1 is smaller than the ratio of the pixel pitch PV to the second optical structural period P2, the moiré fringes in the vertical direction caused in general by the horizontal pixel pitch PH are more easily generated than the moiré fringes in the horizontal direction caused by the vertical pixel pitch PV, and thus the strength of the moiré fringes in the vertical direction is also higher. This is because, usually, although if the pixel pitches PH and PV are larger than the first optical structural period P1 and the second optical structural period P2, the moiré fringes are hard to occur, but the pixel pitches PH and PV approach the optical structural periods P1 and P2 of the condensing sheets due to the enhancement of precision of the liquid crystal display panels of these days as described above, and also it is hard to reduce the optical structural periods P1 and P2 of the condensing sheets as describe above, thus the moiré fringes caused by the smaller pixel pitch PH cannot be avoided under the current circumstance.

In the present embodiment, under the circumstance mentioned above, the first condensing sheet 162 is separated apart from the liquid crystal display panel 120 farther than the second condensing sheet 164. Since the distance between the first condensing sheet 162 and liquid crystal display panel 120 is thus become longer, and thus the illuminating light reaches the liquid crystal display panel 120 while the luminance unevenness caused by the first optical structural period P1 is mitigated by the above-mentioned distance, the moiré fringes corresponding to the relationship between the first optical structural period P1 and the horizontal pixel pitch PH is hard to occur, and even if the moiré fringes ever occur, the strength of the moiré fringes can be lowered.

Also, even when the pixel pitches PH and PV are smaller than the optical structural periods P1 and P2, respectively, if the PH or PV is 1/n (n: integer) times of the P1 or P2, since light and dark pixels repeatedly appear along the arrangement direction of the pixels, the moiré fringes occur. Therefore, when the pixel pitches PH and PV are different from the optical structural periods P1 and P2, respectively, it is preferable that the pixel pitches PV and PH be not 1/n (n: integer) times of the optical structural periods P1 and P2. Also, even when the pixel pitches PH and PV are larger than the optical structural periods P1 and P2, respectively, in order to avoid the risk of the occurrence of the moiré fringes, it is preferable that the optical structural periods P1 and P2 be not 1/n (n: integer) times of the pixel pitches PH and PV, respectively.

Figure 4:
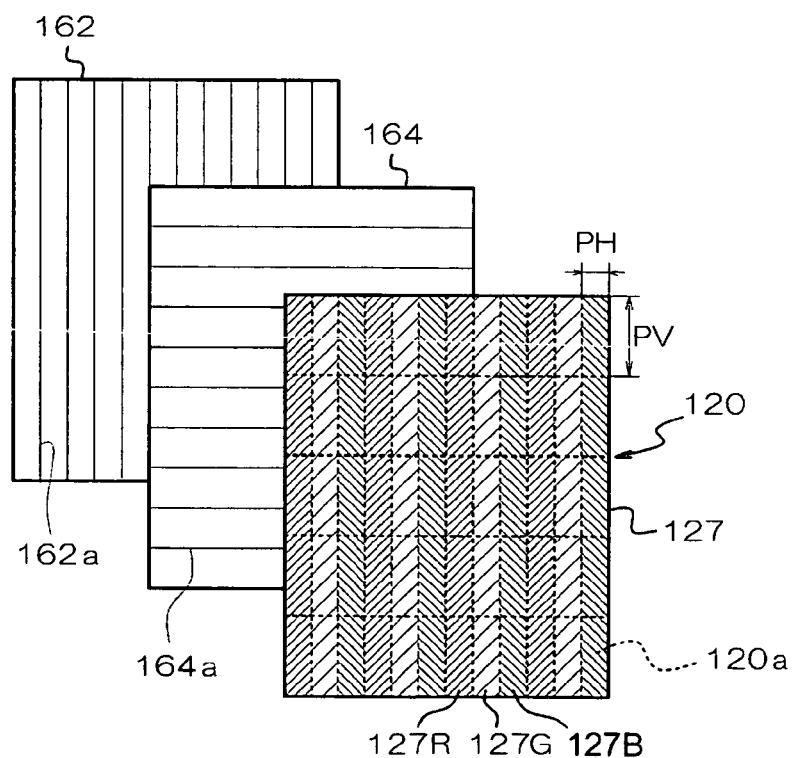
FIG. 4 is an explanatory drawing schematically showing the positional relationship of the liquid crystal display panel and the two condensing sheets where a color filter is disposed.

FIG. 4 is an explanatory drawing schematically showing an overlapped version of a basic pixel arrangement structure of the liquid crystal display panel 120 shown in FIG. 3 together with an arrangement scheme of the color filter 127. In the present embodiment, as described above, the color filter 127 is constituted in a stripe arrangement, and thus a plurality of (three in the illustrated example) colors of colored layers 127R, 128G, and 127B are periodically arranged along the horizontal pixel columns, and the same colors of colored layers are constituted so as to extend when viewed in the direction along the vertical pixel columns.

Here, the pixels 120a are formed so that the pixel pitch PH viewed in the horizontal direction in which the plurality of colors are periodically arranged in the color filter 127 is relatively small, and the pixel pitch PV viewed in the vertical direction in which the same color is arranged in the color filter 127 is relatively large.

This is because, in the color image created by the liquid crystal display panel 120, although the plurality (three in the illustrated example) of pixels 120a in the horizontal direction function as a single picture element (pixel), and a desired color is realized by the plurality (three) of pixels 120a arranged in the horizontal direction, in order to constitute an image having approximately equal resolutions both in the vertical and in the horizontal directions, it is preferable that the above-mentioned picture element be constituted so that the horizontal to vertical dimensional ratio of the picture element approaches 1 as closely as possible. If the horizontal to vertical dimensional ratio of the picture element is to approach 1, as described above, the dimension of each of the pixels 120a in the horizontal direction in which the plurality of pixels 120a included in the picture element are arranged becomes small, and the dimension of each of the pixels 120a in the vertical direction becomes large.

Also, although the color filter 127 of the present embodiment is in stripe-arrangement, the vertical and horizontal dimensions of the individual pixels may be different as in the present embodiment for various reasons, even when arrangement patterns of color filters other than the stripe arrangement are provided such as a delta arrangement or an oblique mosaic arrangement, etc.

Figure 5:
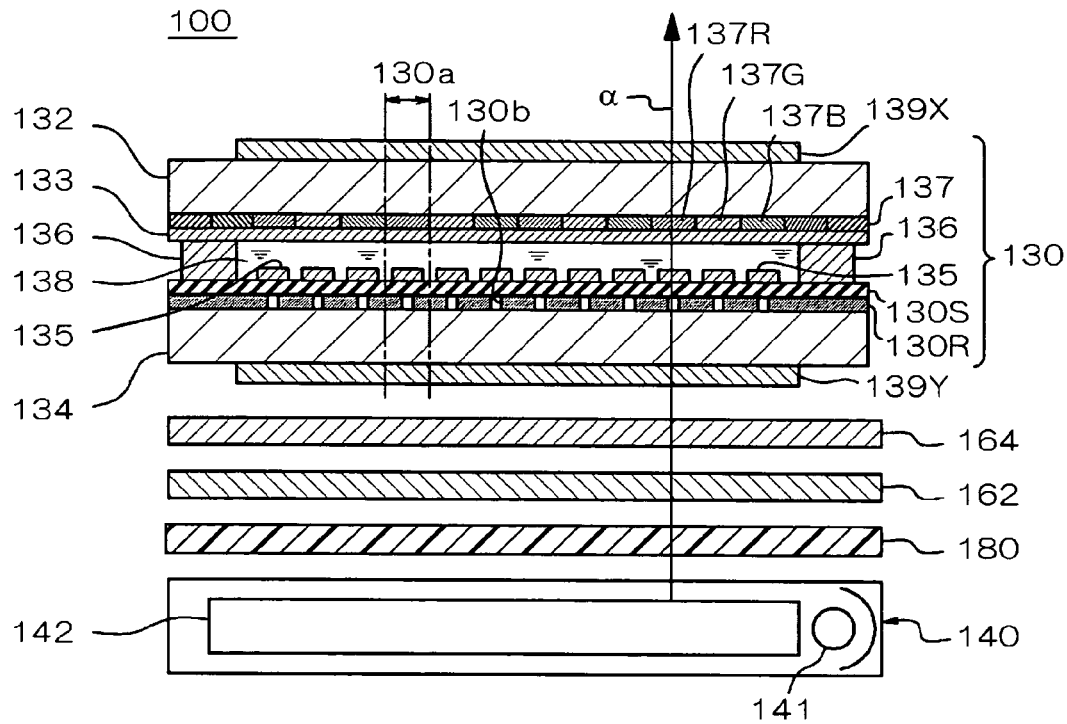
FIG. 5 is a vertical cross sectional view schematically showing a liquid crystal display device of a second embodiment of the invention.

Next, FIG. 5 shows a schematic vertical cross sectional view of an electro-optical device using a liquid crystal display panel having another structure, which is the second embodiment of the invention. The liquid crystal display panel 130 shown in FIG. 5 is a semi-transmissive liquid crystal display panel, which is equipped with substrates 132 and 134, electrodes 133 and 135, a sealing material 136, color filters 137, and polarizing plates 139X and 139Y which are constituted similarly to the liquid crystal display panel 120 of the previous embodiment, and pixels 130a which are vertically and horizontally arranged similarly to the above embodiment, and thus the description thereof will be omitted. Furthermore, the present embodiment is equipped with the backlight 140, light diffusing sheet 180, the first condensing sheet 162, and the second condensing sheet 164 which are the same as in the previous embodiment, and thus the description thereof will also be omitted.

The liquid crystal display panel 130 is equipped with a light reflective layer 130R consisting of aluminum, silver, or an alloy thereof, etc., on the inner surface of the substrate 134. The light reflective layer 130R has an opening for each of the pixels 130a. The opening constitutes a light transmissive region 130b in each of the pixels 130a, and the portion other than the opening is the light reflective region 130c by the light reflective layer 130R. Also, an insulating film 130S is provided on the light reflective layers 130R, and the electrodes 135 are formed on the insulating film 130S.

Also, the light transmissive region 130b provided on each of the pixels 130a is a region that transmits the illuminating light emitted from the backlight 140 that is similar to that in the previous embodiment, and the light reflective region 130c is a region that reflects the outer light introduced from the viewer's side. According to the structure, in the liquid crystal display panel 130, a transmissive display is enabled by turning on the backlight 140, and a reflective display is enabled by turning off the backlight 140 and using the outer light.

Figure 6:
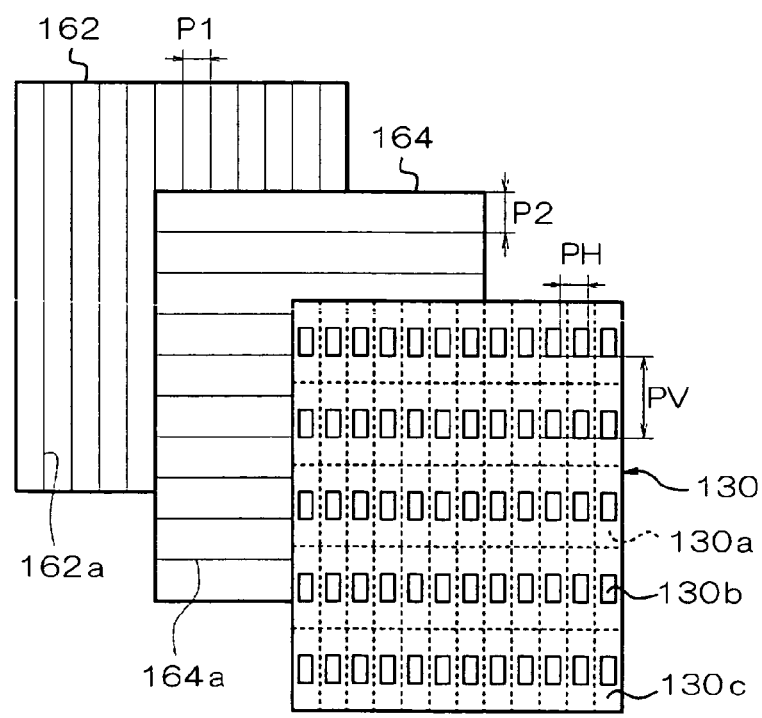
FIG. 6 is a schematic view showing the positional relationship of a liquid crystal display panel and two condensing sheets.

FIG. 6 is an explanatory drawing that schematically shows an overlapped version of the pixel arrangement scheme of the liquid crystal display panel 130 of the present embodiment, the first optical structure of the first condensing sheet 162, and the second optical structure of the second condensing sheet 164.

Each light transmissive region 130b is disposed at the center of each of pixels 130a and the light reflective region 130c surrounds the periphery of the light transmissive region 130b. It is noted that the location of the light transmissive region 130b in each of the pixels 130a is arbitrary. For example, the light transmissive region 130b may be disposed on the upper part of the pixel 130a in the drawing, and the light reflective region 130c may be disposed on the lower part in the drawing. According to the structure, the shapes of the light transmissive region 130b and the light reflective region 130c provided in each of the vertically long rectangle-shaped pixels 130a can be made to rectangular shapes which are close to squares. Also, two or more light transmissive regions 130b may be provided in a single pixel 130a. For example, two or more light transmissive regions 130b may be separately disposed in the pixel 130a.

In the present embodiment, the description will be made with the horizontal formation pitch of the light transmissive region 130b being denoted as PH, and the vertical formation pitch of the light transmissive region 130b being denoted as PV. It is noted that, if the formation locations of the light transmissive regions 130b in the pixels 130a are the same, the formation pitches PH and PV are the same as the vertical pixel pitch and the horizontal pixel pitch, respectively.

In the present embodiment, as in the previously described embodiment, the first condensing sheet 162 is disposed on the side of the backlight 140, and the second condensing sheet 164 is disposed on the side of the liquid crystal display panel 130. Also, although the relationship between the pixel pitch and the optical structural period of the condensing sheet was explained in the previous embodiment, since what concerns the moiré fringes is the formation pitch of the light transmissive region rather than the pixel pitch as a practical matter, the relationship between the horizontal formation pitch PH and the vertical formation pitch PV of the light transmissive region 130b in the present embodiment, and the first optical structural period P1 and the second optical structural period P2 is similar to that in the previous embodiment. Therefore, as in the previous embodiment, as for the transmissive display of the present embodiment, by separating the first condensing sheet 162 apart from the liquid crystal display panel 130, it is possible to make the moiré fringes harder to occur, and to reduce the strength of the moiré fringes.

In each of the embodiments described above, it has been described that two condensing sheets 162 and 164 are disposed. However, even when three or more condensing sheets are disposed, the similar effect can be achieved by disposing a first condensing sheet on the backlight side rather than any other condensing sheets. In particular, it is most preferable that the first condensing sheet be disposed at the backlight side than any other condensing sheets.

Furthermore, the distance between the first condensing sheet and the liquid crystal display panel can be further increased by disposing optical sheets other than the condensing sheets such as other optical layer, e.g., a light diffusing sheet, a reflective polarizing plate, etc., at each of the liquid crystal display panels 120 and 130 side of the first condensing sheet, and therefore the above-mentioned effect can be even more enhanced.

Electronic Apparatus

Figure 7:
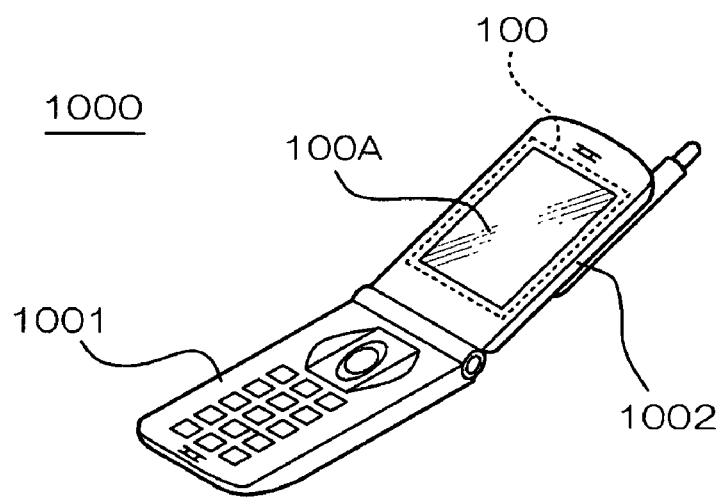
FIG. 7 is a schematic perspective view showing a cellular phone that is one embodiment of an electronic apparatus according to the invention.
Figure 8:
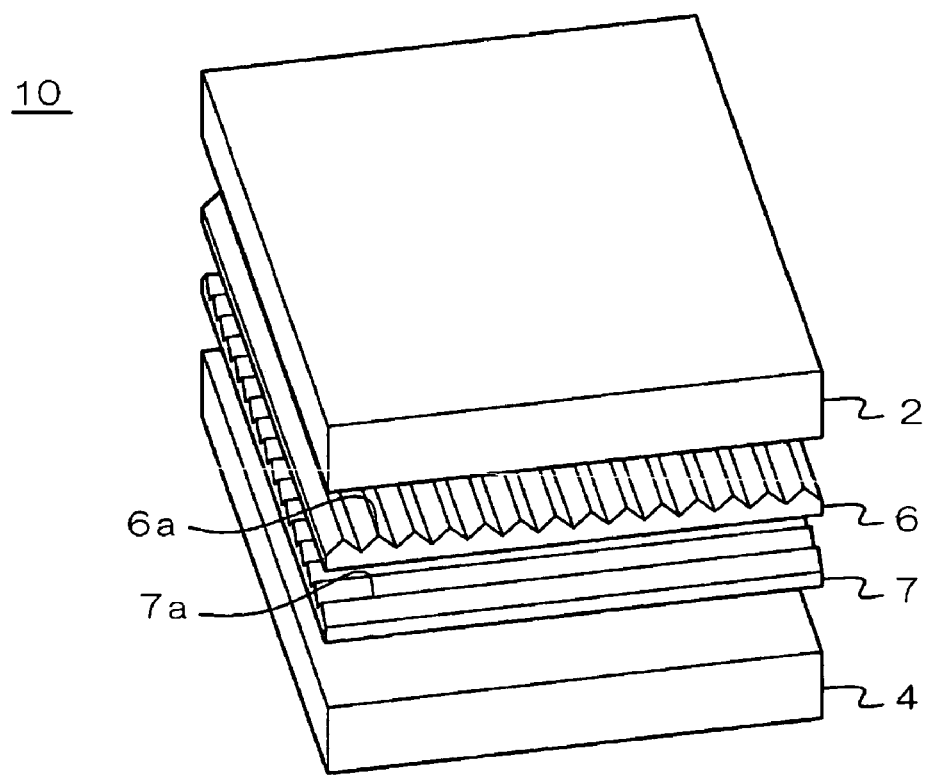
FIG. 8 is a perspective view schematically showing a liquid crystal display device using condensing sheets according to the related art.

Next, the embodiment in which the electro-optical device according to the above-described embodiment is used to an electronic apparatus will be described. FIG. 7 shows a cellular phone that is one embodiment of the electronic apparatus according to the invention. The cellular phone 1000 shown herein includes a manipulation part 1001 equipped with a plurality of manipulation buttons, a mouthpiece, etc., and a display part 1002 equipped with an earpiece. The above-mentioned liquid crystal display device 100 is incorporated in the display part 1002. The surface (inner surface) of the display part 1002 is made so that the display surface 100A of the liquid crystal display device 100 can be visually recognized. Here, a display control circuit that controls the liquid crystal display device 100, and the like, are provided in the cellular phone 1000. The display control circuit sends predetermined control signals to the well-known driving circuit (liquid crystal driver circuit) that drives the liquid crystal display panels 120 and 130, and determines the display scheme of the liquid crystal display device 100.

Furthermore, the electronic apparatus according to the invention can be, in addition to the cellular phone shown in FIG. 7, a liquid crystal television, a car navigator, a pager, an electronic notebook, an electronic calculator, a workstation, a videophone, a POS terminal, etc. The liquid crystal display device according to the invention can be used as a display part of each of these various electronic apparatuses.

Furthermore, it is needless to mention that the invention is not limited to the illustrated examples described above, and various modifications can be made without departing from the gist of the invention. For example, although the present embodiments have been explained for the liquid crystal display device equipped with a liquid crystal display panel, the invention can also be applied to other electro-optical devices such as electrophoretic display device, etc., without being limited to the liquid crystal display device, if the other electro-optical devices each perform the display or image projection using illuminating light.

The entire disclosure of Japanese Patent Application No. 2005-081120, filed Mar. 22, 2005, is expressly incorporated by reference herein.

What is claimed is:

1. An electro-optical device comprising:
    an electro-optical panel that includes a plurality of pixels arranged in a plane, each pixel includes a light transmissive region having a first arrangement period in a first direction in the plane and a second arrangement period in a second direction in the plane, the first direction being orthogonal to the second direction and the second arrangement period being larger than the first arrangement period;
    a backlight that irradiates light on the electro-optical panel;
    a first condensing layer that is disposed between the electro-optical panel and the backlight and that has a plurality of elongate prismatic optical structures, and has a first optical structural period in the first direction; and
    a second condensing layer that is disposed between the electro-optical panel and the first condensing layer and that has a plurality of elongate optical structures, and has a second optical structural period in the second direction,
    wherein an angle between oblique surfaces that form the prismatic optical structures of the first and second condensing layers is between 80 and 90 degrees,
    wherein the ratio of the first arrangement period to the first optical structural period is smaller than the ratio of the second arrangement period to the second optical structural period, and
    the elongate prismatic optical structures of the first condensing layer are arranged in parallel with a length direction of each pixel, the elongate prismatic optical structures of the second condensing layer are arranged in parallel with a width direction of each pixel, a length of each pixel being greater than a width of each pixel.

2. The electro-optical device according to, claim 1, wherein the first optical structural period is equal to or below the first arrangement period.

3. The electro-optical device according to claim 1, wherein the second optical structural period is equal to or below the second arrangement period.

4. The electro-optical device according to claim 1, wherein the first optical structural period is smaller than the second optical structural period.

5. The electro-optical device according to claim 1, wherein another optical layer is disposed between the electro-optical panel and the first condensing layer.

6. An electronic apparatus comprising: the electro-optical device according to claim 1; and a control unit for the electro-optical device.

7. An electro-optical device comprising:
    an electro-optical panel that includes a plurality of pixels arranged in a plane, each pixel includes a light transmissive region having a first arrangement period in a first direction in the plane and a second arrangement period in a second direction in the plane, the first direction being orthogonal to the second direction and the second arrangement period being larger than the first arrangement period;
    a backlight that irradiates light on the electro-optical panel;
    a first condensing layer that is disposed between the electro-optical panel and the backlight and that has a plurality of elongate prismatic optical structures, and has a first optical structural period in the first direction; and
    a second condensing layer that is disposed between the electro-optical panel and the first condensing layer and that has a plurality of elongate optical structures, and has a second optical structural period in the second direction,
    wherein the ratio of the first arrangement period to the first optical structural period is smaller than that ratio of the second arrangement period to the second optical structural period, and
    the first arrangement period, and the second arrangement period are not 1/n (n: integer) times the first optical structural period, and the second optical structural period, respectively.

8. The electro-optical device according to claim 1, wherein the formation direction of the first optical structural period of the first condensing layer and the horizontal direction represented by the first arrangement period are inclined to each other within a range of about 1 to 25 degrees.

9. The electro-optical device according to claim 1, wherein the formation direction of the second optical structural period of the second condensing layer and the vertical direction represented by the second arrangement period are inclined to each other within a range of about 1 to 25 degrees.

* * * * *